US012725912B2

(12) United States Patent
Golovlev et al.

(10) Patent No.: US 12,725,912 B2
(45) Date of Patent: Sep. 1, 2026

(54) COMPOSITE ANTENNA DEVICE

(71) Applicant: HARADA INDUSTRY CO., LTD., Tokyo (JP)

(72) Inventors: Igor Golovlev, Tokyo (JP); Yutaka Imamura, Tokyo (JP); Hidekazu Kobayashi, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 26 days.

(21) Appl. No.: 18/852,357

(22) PCT Filed: Mar. 16, 2023

(86) PCT No.: PCT/JP2023/010243
§ 371 (c)(1),
(2) Date: Sep. 27, 2024

(87) PCT Pub. No.: WO2023/189641
PCT Pub. Date: Oct. 5, 2023

(65) Prior Publication Data

US 2025/0219285 A1 Jul. 3, 2025

(30) Foreign Application Priority Data

Mar. 30, 2022 (JP) ................................ 2022-057396

(51) Int. Cl.
*H01Q 1/32* (2006.01)
*H01Q 5/385* (2015.01)
*H01Q 9/04* (2006.01)
*H01Q 9/26* (2006.01)

(52) U.S. Cl.
CPC ............... *H01Q 1/32* (2013.01); *H01Q 5/385* (2015.01); *H01Q 9/0407* (2013.01); *H01Q 9/265* (2013.01)

(58) Field of Classification Search
CPC ........ H01Q 1/32; H01Q 5/385; H01Q 9/0407; H01Q 9/265
See application file for complete search history.

(56) References Cited

U.S. PATENT DOCUMENTS

2009/0207086 A1 8/2009 Shinkawa et al.

FOREIGN PATENT DOCUMENTS

| | | | |
|---|---|---|---|
| JP | 2009-225429 A | | 10/2009 |
| JP | 2010-283855 A | | 12/2010 |
| JP | 2011151624 A | * | 8/2011 |
| JP | 2017-060038 A | | 3/2017 |
| JP | 2018-37799 A | | 3/2018 |

OTHER PUBLICATIONS

International Search Report in PCT/JP2023/010243, dated May 30, 2023.

* cited by examiner

*Primary Examiner* — Graham P Smith
(74) *Attorney, Agent, or Firm* — Spencer Fane LLP

(57) ABSTRACT

A composite antenna includes a dipole antenna element and a circularly polarized antenna element. The dipole antenna element includes a first hot terminal, a ground terminal, a first element extending from the first hot terminal, and a second element extending from the ground terminal. The circularly polarized antenna element includes a second hot terminal disposed on a line connecting the first hot terminal and the ground terminal so as to be sandwiched therebetween, a third element extending from the second hot terminal, and a fourth element extending from the ground terminal perpendicularly with respect to the third element.

9 Claims, 3 Drawing Sheets

COMPOSITE ANTENNA DEVICE

CROSS-REFERENCE TO RELATED APPLICATIONS

This application is a U.S. national stage application of International Application No. PCT/JP2023/010243, filed on Mar. 16, 2023. This application claims priority to Japanese Patent Application No. 2022-0557396 filed on Mar. 30, 2022.

BACKGROUND

Technical Field

The present invention relates to a composite antenna device, and more particularly to a film-type composite antenna device for vehicles.

Background Information

As vehicle-mounted (e.g., automobile-mounted) antennas capable of receiving circularly polarized waves, which are represented by GPS antennas, there are generally known patch antennas (microstrip antennas), and there are also now being developed film-type antennas having element patterns arranged therein.

As such antennas supporting circularly polarized waves, there is known Japanese Laid-Open Patent Application No. 2011-151624A (hereinafter referred to as Patent Document 1) by the same applicant as the present applicant. The antenna disclosed in Patent Document 1 has a first element extending from a hot terminal and a second element extending from a ground terminal perpendicularly with respect to the first element, and the first element and the second element are surrounded by a loop element that extends from the ground terminal and returns thereto.

Further, there is also known a film antenna like one disclosed in Japanese Laid-Open Patent Application No. 2018-37799A (hereinafter referred to as Patent Document 2), in which a part of a loop antenna is deformed into a convex shape so as to reduce the mounting area.

SUMMARY

In order to support more frequency bands, there has recently been developed a film-type composite antenna device having a plurality of antenna elements mounted thereon. A vehicle-mounted film-type composite antenna device is restricted in the mounting area, and thus the antenna elements and the connection terminals therein are densely arranged. In such a case, for example, in Patent Document 1, oppositely-directed currents occur between the hot terminal and the ground terminal, so that when the hot terminal and the ground terminal are located closely, radiation efficiency may be deteriorated. Further, even in the element having a convex portion in Patent Document 2, oppositely-directed currents occur between portions facing each other, which may deteriorate radiation efficiency.

The present invention has been made in view of the above situation, and an object thereof is to provide a composite antenna device preventing deterioration in radiation efficiency due to occurrence of oppositely-directed currents, having satisfactory antenna characteristics, and facilitating power supply thereto.

To achieve the above object of the present invention, a composite antenna device according to the present invention includes: a dipole antenna element including a first hot terminal, a ground terminal, a first element extending from the first hot terminal, and a second element extending from the ground terminal; and a circularly polarized antenna element including a second hot terminal disposed on a line connecting the first hot terminal and the ground terminal so as to be sandwiched therebetween, a third element extending from the second hot terminal, and a fourth element extending from the ground terminal perpendicularly with respect to the third element.

The dipole antenna element may be a loop-shaped antenna element obtained by connecting the first element and the second element at their leading ends.

The dipole antenna element may have a parasitic element disposed so as to be capacitively coupled to vicinities of leading ends of the first element and the second element.

The first hot terminal, the second hot terminal, and the ground terminal may be covered with a module terminal including a transceiver.

The composite antenna device may further include a ground loop element that extends from the ground terminal, passes between the first hot terminal and the second hot terminal, then extends so as to surround the second hot terminal, the third element, and the fourth element, and returns back to the ground terminal.

The ground loop element may have a side that extends in parallel to the dipole antenna element.

The ground loop element may have a substantially square shape.

The composite antenna device may further include a second parasitic element disposed inside the ground loop element so as to be capacitively coupled to vicinities of leading ends of the third element and the fourth element.

The second parasitic element may have a side that extends in parallel to the ground loop element.

The composite antenna device according to the present invention is advantageous in preventing deterioration in radiation efficiency due to occurrence of oppositely-directed currents, having satisfactory antenna characteristics, and facilitating power supply thereto.

BRIEF DESCRIPTION OF THE DRAWINGS

Referring now to the attached drawings which form a part of this original disclosure, illustrative embodiments are shown.

DETAILED DESCRIPTION OF EMBODIMENTS

Figure 1:
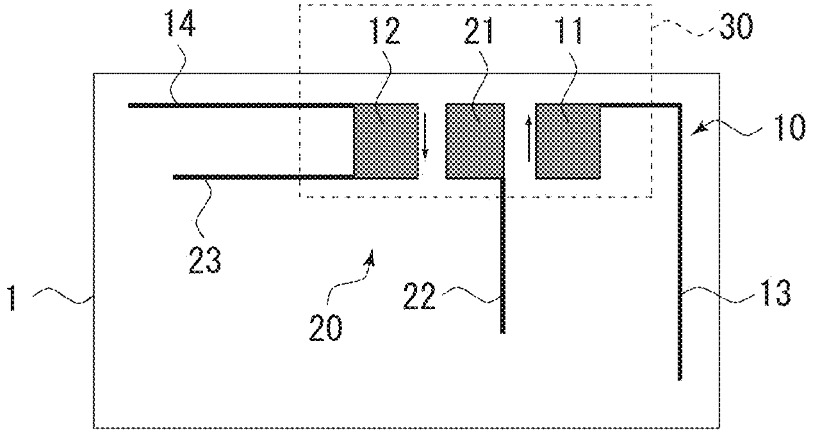
FIG. 1 is a schematic plan view for explaining a composite antenna device according to one illustrated embodiment.

Hereinafter, embodiments for practicing the present invention will be described with illustrated examples. FIG. 1 is a schematic plan view for explaining a composite antenna device according to the present invention. As illustrated, the composite antenna device according to the present invention mainly includes a dipole antenna element 10 and a circularly polarized antenna element 20. The dipole antenna element 10 and circularly polarized antenna element 20 may be formed by using a conductive material such as a conductive fine metal wire or a conductive metal foil. The dipole antenna element 10 and circularly polarized antenna element 20 are arranged, for example, on a transparent film 1 of a dielectric, and the film 1 is attached to a vehicle window. When an antenna is embedded in a resin body, elements may be directly disposed on resin constituting the body.

The dipole antenna element 10 includes a first hot terminal 11, a ground terminal 12, a first element 13, and a second element 14.

The first element 13 extends from the first hot terminal 11. In the illustrated example, the first element 13 extends in a reverse L shape from the hot terminal 11 to the lower side of the drawing. More specifically, the first element 13 extends rightward in the horizontal direction from the upper right corner of the first hot terminal 11 and bends at right angles in the middle to extend downward. In the present invention, the first element 13 is not limited to one that bends in a reverse L shape but may be one that only extends rightward in the horizontal direction from the first hot terminal 11. The length of the first element 13 may be adjusted with reference to λ/4 of a target frequency, for example. Specifically, the adjustment may be made by using, for example, a frequency band for LPWA (Low Power Wide Area) as a target frequency.

The second element 14 extends from the ground terminal 12. In the illustrated example, the second element 14 extends leftward from the ground terminal 12. More specifically, the second element 14 extends leftward in the horizontal direction from the upper left corner of the ground terminal 12. The length of the second element 14 may also be adjusted with reference to λ/4 of a target frequency, for example. Specifically, the adjustment may be made by using, for example, a frequency band for LPWA (Low Power Wide Area) as a target frequency.

The dipole antenna element 10 is constituted of two elements of the first element 13 and the second element 14.

The circularly polarized antenna element 20 includes a second hot terminal 21, a third element 22, and a fourth element 23.

The second hot terminal 21 is disposed on a line connecting the first hot terminal 11 and the ground terminal 12 so as to be sandwiched therebetween. That is, the second hot terminal 21 is interposed between the first hot terminal 11 and the ground terminal 12. Thus, even when oppositely-directed currents (denoted by arrows in FIG. 1) occur between the first hot terminal 11 and the ground terminal 12, shielding effect is caused due to the presence of the second hot terminal 21 to prevent the currents from being cancelled, thus preventing deterioration in radiation efficiency.

The third element 22 extends from the second hot terminal 21. In the illustrated example, the third element 22 extends from the second hot terminal 21 to the lower side in the drawing. More specifically, the third element 22 extends downward from the lower right corner of the second hot terminal 21. The length of the third element 22 may be adjusted with reference to λ/4 of a target frequency, for example to a length shorter than. Specifically, the adjustment may be made by using, for example, a frequency band for GNSS as a target frequency.

The fourth element 23 extends from the ground terminal 12 perpendicularly with respect to the third element 22. That is, the ground terminal 12 serves as a common terminal to the second element 14 and the fourth element 23. The third element 22 and the fourth element 23 are arranged so as to cross at right angles. More specifically, the fourth element 23 extends leftward from the lower left corner of the ground terminal 12. The length of the fourth element 23 may be adjusted with reference to λ/4 of a target frequency, for example to a length longer than.

When the lengths of the third element 22 and the fourth element 23 are adjusted such that the current phases of the third element 22 and the fourth element 23 are delayed and advanced, respectively, by 45 degrees, the current phase difference between the third element 22 and the fourth element 23 is 90 degrees, achieving support for circularly polarized waves.

The lengths of the third element 22 and the fourth element 23 may be adjusted contrary to the above description. That is, the length of the third element 22 may be adjusted with reference to λ/4 of a target frequency, to a length longer there than, and the length of the fourth element 23 may be adjusted with reference to λ/4 of a target frequence to a length shorter there than. The circularly polarized antenna element 20 of the composite antenna device according to the present invention can thus support both the left-hand and right-hand circularly polarized waves. The lengths of the third element 22 and the fourth element 23 may be set equal to each other and, in this case, a phase shifter is provided so as to make the current phase difference therebetween be 90 degrees.

The first hot terminal 11, the second hot terminal 21, and the ground terminal 12 are connected to in-vehicle devices through a pickup, a cable, a module terminal, or the like. As described above, in the composite antenna device according to the present invention, the first hot terminal 11, the second hot terminal 21, and the ground terminal 12 are arranged on a line. Therefore, when, for example, a module terminal 30 incorporating therein a transceiver is used, it is possible to easily locate connection terminals on the first hot terminal 11, the second hot terminal 21, and the ground terminal 12. That is, the first hot terminal 11, the second hot terminal 21, and the ground terminal 12 can be arranged so as to be covered with the module terminal 30 including a transceiver.

Figure 2:
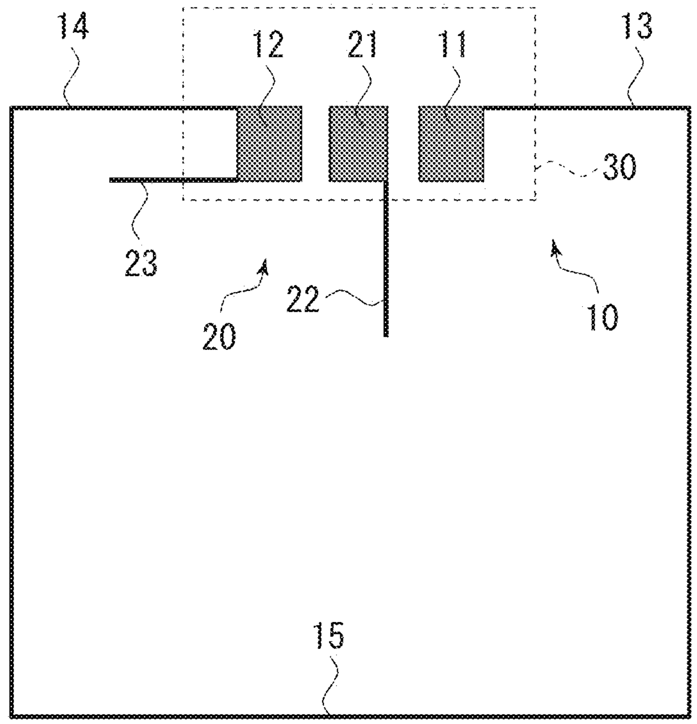
FIG. 2 is a schematic plan view for explaining another example of the composite antenna device according to the illustrated embodiment.

The following describes, using FIG. 2, another example of the composite antenna device according to the present invention. FIG. 2 is a schematic plan view for explaining another example of the composite antenna device according to the present invention. In the drawing, the same reference numerals as those in FIG. 1 denote the same parts. In this example, the dipole antenna element 10 is constituted by a loop-shaped antenna element 15 obtained by connecting the first element 13 and the second element 14 at their leading ends. The loop-shaped antenna element 15 surrounds the third element 22 and the fourth element 23. As illustrated, the antenna element 15 having a substantially square loop shape is disposed so as to surround the outermost periphery of the composite antenna device according to the present invention. Such a configuration is possible depending on the target frequency of the dipole antenna element 10. The present invention is not limited to this, and it may be a rectangular shape or a circular shape.

Figure 3:
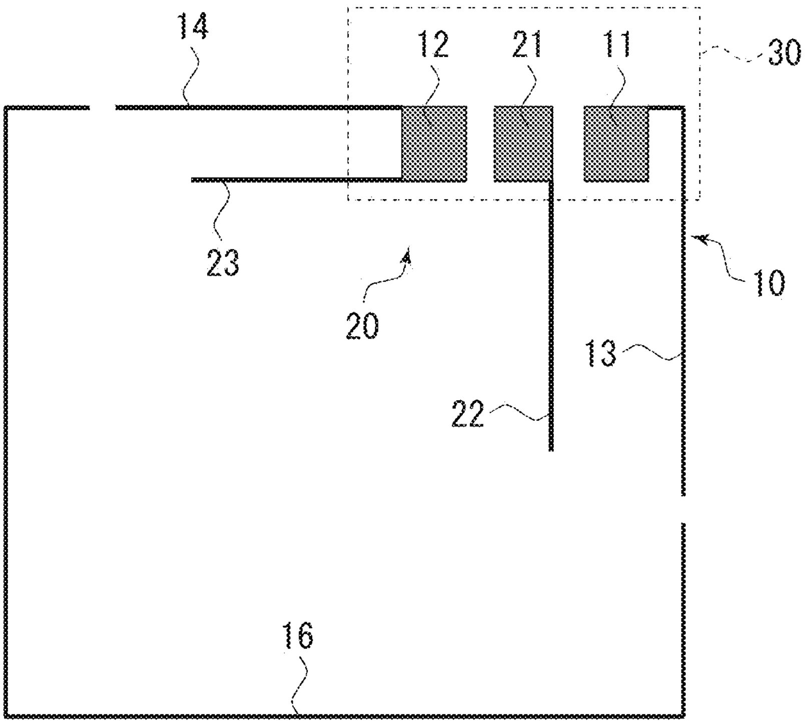
FIG. 3 is a schematic plan view for explaining still another example of the composite antenna device according to the illustrated embodiment.

The following describes, using FIG. 3, still another example of the composite antenna device according to the present invention. FIG. 3 is a schematic plan view for explaining still another example of the composite antenna device according to the present invention. In the drawing, the same reference numerals as those in FIG. 1 denote the same parts. In this example, the dipole antenna element 10 has a parasitic element 16. The parasitic element 16 is disposed so as to be capacitively coupled to the vicinities of the leading ends of the first element 13 and the second element 14. The parasitic element 16 surrounds the third element 22 and the fourth element 23 together with the first element 13 and the second element 14. That is, the leading ends of the first element 13 and the second element 14 are electrically connected by the parasitic element 16 to constitute an antenna element like a loop-shaped one, allowing the dipole antenna element 10 to perform the same electric behavior as that in the configuration of FIG. 2.

When the composite antenna device according to the present invention is attached to a vehicle window, the performance of the dipole antenna element 10 is influenced by the size and position of the vehicle. Thus, the configuration using the loop-shaped antenna element 15 as illustrated in FIG. 2 or configuration using the parasitic element 16 as illustrated in FIG. 3 may be appropriately selected depending on the installation position. For example, the antenna performance is significantly influenced by a vehicle metal portion in some installation position, and thus configuration using the parasitic element 16 is sometimes advantageous in performance at horizontal plane low elevation angle.

Figure 4:
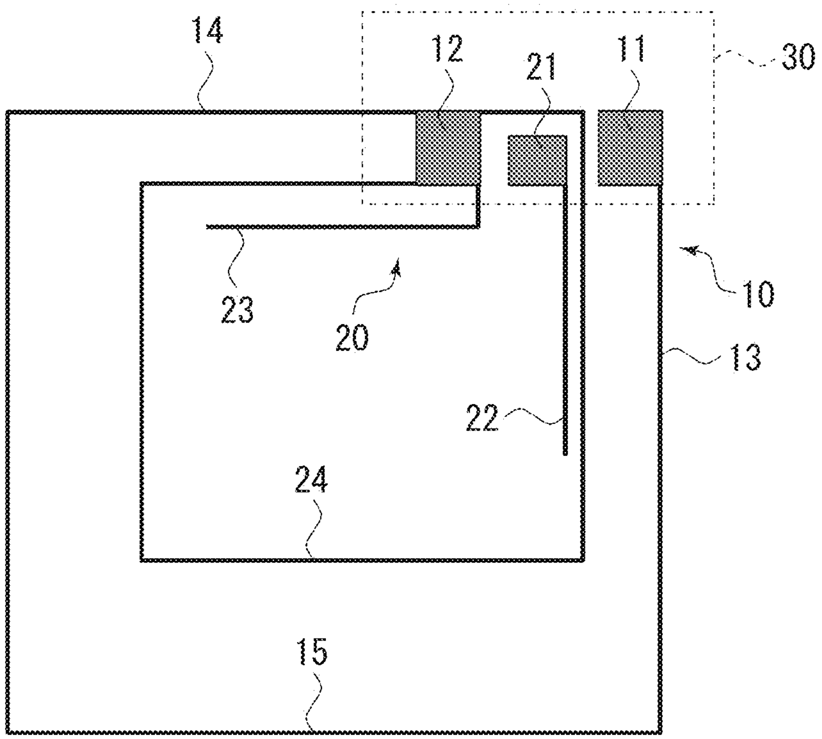
FIG. 4 is a schematic plan view for explaining still another example of the composite antenna device according to the illustrated embodiment.

The following describes, using FIG. 4, still another example of the composite antenna device according to the present invention. FIG. 4 is a schematic plan view for explaining still another example of the composite antenna device according to the present invention. In the drawing, the same reference numerals as those in FIG. 1 denote the same parts. In this example, the composite antenna device according to the present invention further has a ground loop element 24. The ground loop element 24 extends in a loop from the ground terminal 12. Specifically, the ground loop element 24 extends from the ground terminal 12, passes between the first hot terminal 11 and the second hot terminal 21, then extends so as to surround the second hot terminal 21, the third element 22, and the fourth element 23, and returns back to the ground terminal 12. That is, all the terminals and elements constating the circularly polarized antenna element 20 is surrounded by the ground loop element 24. In the illustrated example, the ground loop element 24 has a substantially square shape, and the sides thereof extend in parallel to the third element 22 and the fourth element 23.

The first hot terminal 11, the second hot terminal 21, and the ground terminal 12 need not have the same size. As illustrated, the second hot terminal 21 may have a reduced height as long as it is disposed on a line connecting the first hot terminal 11 and the ground terminal 12. In the illustrated example, the ground loop element 24 passes a space obtained by the height reduction.

In the examples illustrated in FIGS. 1 to 3, the dipole antenna element 10 and circularly polarized antenna element 20 are preferably separated from each other to such a degree that mutual interference therebetween does not affect reception of circularly polarized wave signals. Specifically, assume that the dipole antenna element 10 is used for LPWA, for example. In LPWA, vertically polarized waves are mainly transmitted and received, so that importance is placed on antenna characteristics for vertically polarized waves. Therefore, the first element 13 sometimes preferably extends downward from the first hot terminal 11 rather than bends in a reverse L shape as illustrated in FIG. 1. However, when the first element 13 is made to extend downward directly from the first hot terminal 11, the distance between the first hot terminal 11 and circularly polarized antenna element 20 is reduced, which may adversely affect the circularly polarized antenna element 20. On the other hand, in the example illustrated in FIG. 4, the ground loop element 24 is disposed so as to pass between the first hot terminal 11 and the second hot terminal 21, shielding effect between the dipole antenna element 10 and circularly polarized antenna element 20 can be achieved. This can make the dipole antenna element 10 and circularly polarized antenna element 20 closer to some extent. This allows the first element 13 to extend directly from the lower right corner of the first hot terminal 11 as illustrated in FIG. 4.

The length of the ground loop element 24 may be adjusted, for example, with reference to twice the length of one of the third element 22 and the fourth element 23 to a length shorter there than. With such arrangement of the ground loop element 24, there are generated in the ground loop element 24 oppositely-directed currents to cancel respectively currents generated in the third element 22 and the fourth element 23. As a result, the currents generated in the third element 22 and the fourth element 23 are hardly applied on cables connected to the second hot terminal 21 and the ground terminal 12. That is, it is possible to obtain substantially the same effect as that obtained when the circularly polarized antenna element 20 is grounded. This eliminates the need for the composite antenna device according to the present invention to be grounded to a vehicle roof or the like, improving mountability.

With the above configuration, impedance is reduced (e.g., to about 60Ω), thus eliminating the need for the circularly polarized antenna element 20 of the composite antenna according to the present invention to have a balun for impedance adjustment. This allows miniaturization of the module terminal 30 connected to the circularly polarized antenna element 20 of the composite antenna device according to the present invention and cost reduction.

In the illustrated example, the ground loop element 24 has a substantially square shape; however, the shape thereof is not limited to the square shape but may be a rectangular shape or a shape having a curved line, such as a circular shape.

Figure 5:
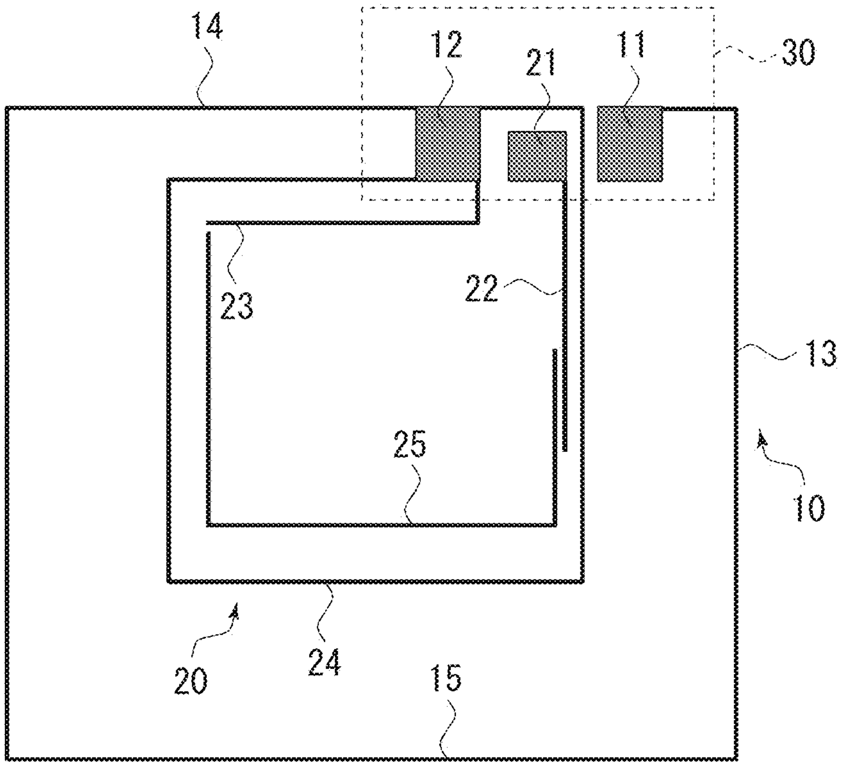
FIG. 5 is a schematic plan view for explaining still another example of the composite antenna device according to the illustrated embodiment.

The following describes, using FIG. 5, still another example of the composite antenna device according to the present invention. FIG. 5 is a schematic plan view for explaining still another example of the composite antenna device according to the present invention. In the drawing, the same reference numerals as those in FIG. 1 denote the same parts. In this example, the composite antenna device according to the present invention further has a second parasitic element 25. In the illustrated example, the dipole antenna element 10 has the parasitic element 16 as illustrated in FIG. 3; however, the present invention is not limited to this, and the dipole antenna element 10 need not necessarily have the parasitic element 16 as illustrated in FIG. 1. Further, as illustrated in FIG. 2, the dipole antenna element 10 may be constituted by the loop-shaped antenna element 15.

The second parasitic element 25 is disposed inside the ground loop element 24. The second parasitic element 25 is disposed so as to be capacitively coupled to the vicinities of the leading ends of the third element 22 and the fourth elements 23. In the illustrated example, for stronger capacitive coupling with the third element 22, the leading end thereof overlap each other by a certain length. The second parasitic element 25 is disposed along the ground loop element 24. In the illustrated example, the second parasitic element 25 is disposed along the three sides of the ground loop element 24 in consideration of design; however, the present invention is not limited to this, and the second parasitic element 25 may be disposed along only one side of the ground loop element 24 as long as it is capacitively coupled to the vicinity of the leading end of the third element 22 or fourth element 23.

In this configuration, impedance can be adjusted by the length of the overlap between the leading ends of the second parasitic element 25 and third element 22 or distance therebetween.

The thus configured circularly polarized antenna element 20 of the composite antenna according to the present invention can adjust impedance, increase gain, and achieve a wide bandwidth.

Thus, according to the thus configured composite antenna device of the present invention, it is possible to prevent deterioration in radiation efficiency of the dipole antenna element 10 while improving the performance of the circularly polarized antenna element 20, making both the dipole antenna element 10 and circularly polarized antenna element 20 have satisfactory antenna characteristics. Further, the first hot terminal 11, the second hot terminal 21, and the ground terminal 12 are arranged on a line to facilitate power feeding.

The composite antenna device according to the present invention is not limited to the illustrated examples described above, and it goes without saying that various changes may be made without departing from the gist of the present invention.

The invention claimed is:

1. A composite antenna device for vehicles, the composite antenna device comprising:

a dipole antenna element including a first hot terminal, a ground terminal, a first element extending from the first hot terminal, and a second element extending from the ground terminal; and a circularly polarized antenna element including a second hot terminal disposed on a line connecting the first hot terminal and the ground terminal so as to be sandwiched for obtaining shielding effect therebetween, a third element extending from the second hot terminal, and a fourth element extending from the ground terminal perpendicularly with respect to the third element.

2. The composite antenna device according to claim 1, wherein the dipole antenna element is a loop-shaped antenna element obtained by connecting the first element and the second element at their leading ends.

3. The composite antenna device according to claim 1, wherein the dipole antenna element has a first parasitic element disposed adjacent to leading ends of the first element and the second element so as to be capacitively coupled to the leading ends of the first element and the second element.

4. The composite antenna device according to claim 1, wherein the first hot terminal, the second hot terminal, and the ground terminal are configured to be covered with a module terminal.

5. The composite antenna device according to claim 1, further comprising a ground loop element that extends from the ground terminal, passes between the first hot terminal and the second hot terminal, then extends so as to surround the second hot terminal, the third element, and the fourth element, and returns back to the ground terminal.

6. The composite antenna device according to claim 5, wherein the ground loop element has a side that extends in parallel to the dipole antenna element.

7. The composite antenna device according to claim 5, wherein the ground loop element has a substantially square shape.

8. The composite antenna device according to claim 5, further comprising a second parasitic element disposed inside the ground loop element and adjacent to leading ends of the third element and the fourth element so as to be capacitively coupled to the leading ends of the third element and the fourth element.

9. The composite antenna device according to claim 8, wherein the second parasitic element has a side that extends in parallel to the ground loop element.

* * * * *